United States Patent [19]

Judge

[11] Patent Number: 4,608,690
[45] Date of Patent: Aug. 26, 1986

[54] DETECTING IMPROPER OPERATION OF A DIGITAL DATA PROCESSING APPARATUS

[75] Inventor: John L. Judge, Hillsboro, Oreg.

[73] Assignee: Tektronix, Inc., Beaverton, Oreg.

[21] Appl. No.: 743,266

[22] Filed: Jun. 10, 1985

Related U.S. Application Data

[63] Continuation of Ser. No. 444,766, Nov. 26, 1982, abandoned.

[51] Int. Cl.⁴ .................. G11C 29/00; G06F 11/00
[52] U.S. Cl. .................. 371/21; 364/900; 358/147
[58] Field of Search .................. 371/21, 24, 25, 27; 365/200, 201; 358/145, 147, 339; 360/32, 36.2, 53; 364/200 MS File, 900 MS File

[56] References Cited

U.S. PATENT DOCUMENTS

| | | | |
|---|---|---|---|
| 4,055,754 | 10/1977 | Chesley | 371/21 |
| 4,101,939 | 7/1978 | Owen et al. | 360/36 |
| 4,122,477 | 10/1978 | Gallo | 358/4 |
| 4,159,480 | 6/1979 | Tachi | 358/8 |
| 4,195,770 | 4/1980 | Benton et al. | 371/21 |
| 4,233,668 | 11/1980 | Yamaguchi et al. | 365/1 |
| 4,286,281 | 8/1981 | Suzuki | 358/4 |
| 4,293,950 | 10/1981 | Shimizu et al. | 371/21 |
| 4,308,557 | 12/1981 | Dieterich | 358/128.5 |
| 4,335,457 | 6/1982 | Early | 364/900 X |
| 4,392,159 | 7/1983 | Lemoine et al. | 358/319 |

OTHER PUBLICATIONS

IBM Technical Disclosure Bulletin, vol. 24, No. 2, Jul. 1981, "RAM Tester Calibration Check" p. 965 by T. Hwang.

*Primary Examiner*—James D. Thomas
*Assistant Examiner*—Thomas C. Lee
*Attorney, Agent, or Firm*—John Smith-Hill

[57] ABSTRACT

Improper operation of a digital data processing apparatus is detected by applying a predetermined pattern of test digits to a data input of the apparatus and determining whether the pattern of digits provided at the data output of the apparatus in response to the application of the predetermined pattern of test digits to the data input is the same as the pattern that would be provided at the data output if the apparatus were operating properly.

7 Claims, 1 Drawing Figure

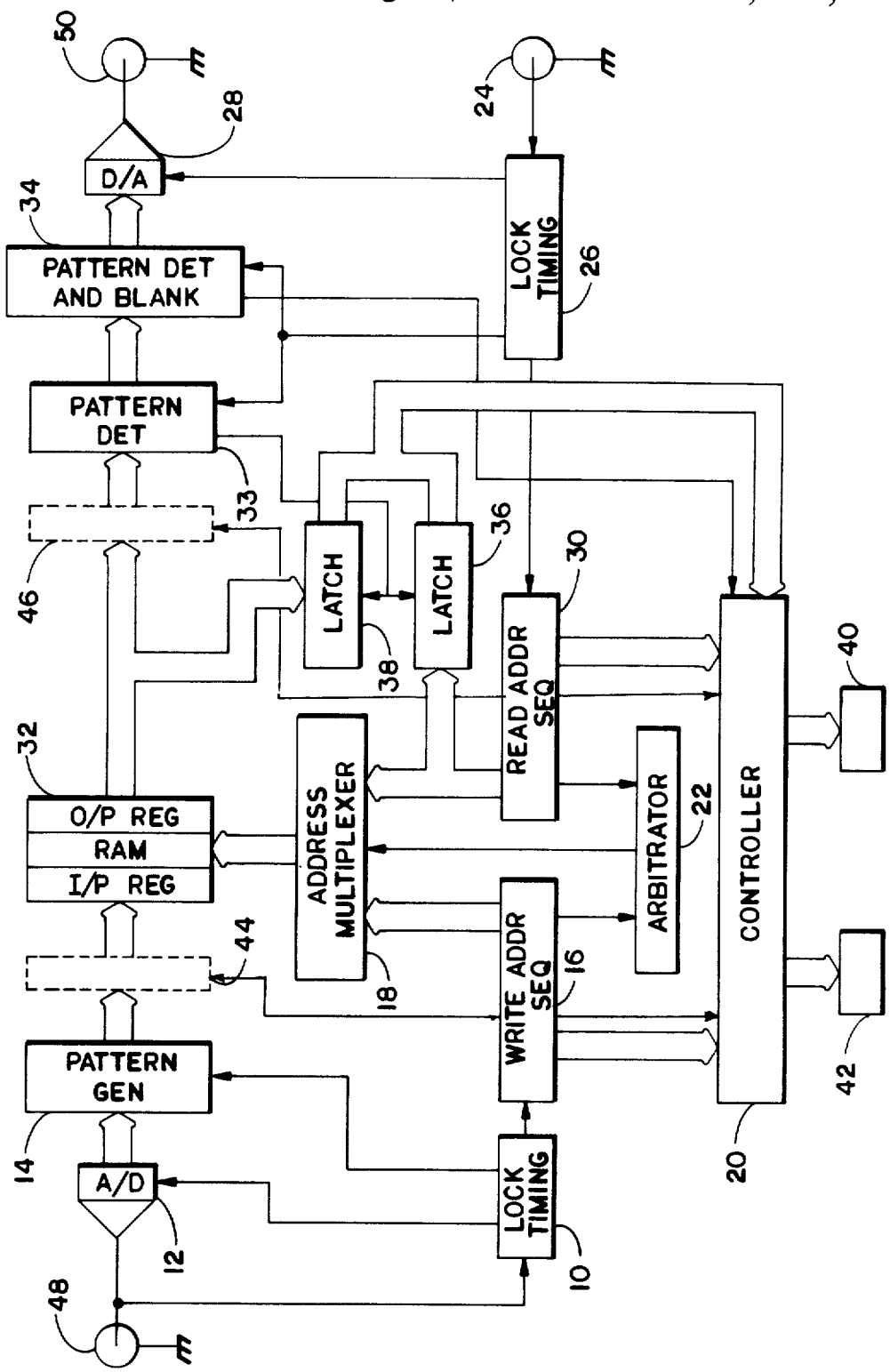

DETECTING IMPROPER OPERATION OF A DIGITAL DATA PROCESSING APPARATUS

This is a continuation of application Ser. No. 444,766 filed Nov. 26, 1982 and now abandoned.

This invention relates to the detection of improper operation of a digital data processing apparatus.

It is desirable that a fault condition occurring in a digital data processing apparatus be detected promptly. Furthermore, it is desirable that the detection of a fault condition should be accomplished during operation of the apparatus, without its being necessary to stop operation in order to detect a fault condition.

The present invention may be used to detect a fault condition in a digital video signal processing apparatus including a large memory, such as a frame or multi-frame store, located between the point of analog-to-digital conversion and the point of digital-to-analog conversion. In a preferred embodiment of the invention, a fault condition which is identified as a memory bit error is at least partially concealed by shifting the data digits entering and leaving the memory such that the faulty memory device is in the path of the least significant data digit.

According to one aspect of the present invention there is provided a method of detecting improper operation of a digital data processing apparatus, comprising applying a predetermined pattern of test digits to a data input of the apparatus and determining whether the pattern of digits provided at a data output of the apparatus in response to application of said predetermined pattern of test digits to said data input is the same as the pattern that would be provided at said data output if the apparatus were operating properly.

According to another aspect of the present invention there is provided in combination, a digital data processing apparatus having a data input and a data output, and an apparatus for detecting improper operation of the data processing apparatus and comprising a first circuit for applying a predetermined pattern of data digits to said data input and a second circuit for determining whether the pattern of data digits provided at the output of the apparatus in response to application of the predetermined pattern of data digits to said data input is the same as the pattern that would be provided at said data output if the apparatus were operating properly.

BRIEF DESCRIPTION OF THE DRAWINGS

For a better understanding of the invention, and to show how the same may be carried into effect, reference will now be made, by way of example, to the accompanying drawing, the single FIGURE of which is a block diagram of a television frame synchronizer including circuit elements for testing the frame synchronizer.

The illustrated frame synchronizer receives a composite video input signal, including sync pulses and video information. The video information may include a color subcarrier. The frame synchronizer encodes the input signal into the digital form and temporarily stores the digital data in a memory array. The digital data is read out of the memory array and decoded into analog form, under control of a reference signal including sync pulses and a subcarrier wave, thereby to generate from the input signal a corresponding composite video output signal in which the sync pulses and the color subcarrier (if present in the video information of the input signal) are in predetermined phase relationship to the sync pulses and subcarrier wave of the reference signal.

The composite video input signal is applied to a video signal input terminal 48 which is connected to a write lock and timing circuit 10 and to an analog-to-digital converter 12, preferably a ten-bit analog-to-digital converter. The lock and timing circuit 10 generates a continuous waveform at the color subcarrier frequency and synchronized with the color burst signal of the composite video input signal. This continuous waveform is used to generate clock pulses at a repetition rate equal to a multiple of, for example 4 times, the subcarrier frequency, and these clock pulses establish the sampling times of the converter 12. Thus, at each clock pulse the A/D converter 12 generates a 10 bit data word representing in binary code the voltage level of the signal present at the video signal input terminal on occurrence of the clock pulse. The clock pulses from the lock and timing circuit 10 are additionally supplied to a write address sequencer 16. In response to the clock pulses, the write address sequencer 16 generates a predetermined sequence of address words which are supplied both to an address multiplexer 18 and to a controller 20. While an address word is being applied by the write address sequencer 16 to the address multiplexer 18 and to the controller 20, a memory access request signal is applied to an arbitrator 22.

The reference input signal is applied to a reference input terminal 24 which is connected to a read lock and timing circuit 26. The read lock and timing circuit 26 operates in similar fashion to the write lock and timing circuit 10, in that it generates a continuous wave at the reference subcarrier frequency and produces therefrom a train of clock pulses at the same multiple of the reference subcarrier frequency as that relating the frequency of the clock pulses generated by the circuit 10 to the input video signal subcarrier frequency. The clock pulses are applied to a ten-bit digital-to-analog converter 28 to establish conversion times for the converter. The clock pulses are also applied to a read address sequencer 30 to generate the same predetermined sequence of address words as is generated by the sequencer 16 and apply the sequence of address words to the address multiplexer 18 and to the controller 20. While an address word is being applied by the read address sequencer 30 to the address multiplexer 18 and to the controller 20, a memory access request signal is applied to the arbitrator 22.

The output bus of the A/D converter 12 is connected through a pattern generator 14 to the internal data bus of a memory array 32. The internal data bus of the memory array 32 is also connected through a pattern detector 33 and a pattern detector and blanking circuit 34 to the input bus of the D/A converter 28. The address bus of the memory array is connected to the address multiplexer 18. As will be apparent from the foregoing, the data words received from the A/D converter 12 in synchronism with the clock pulses generated by the timing circuit 10 are written into the memory array 32 utilizing the memory locations defined by the address words provided to the memory array by the sequencer 16, and the data words are read out of the memory array 32, from the locations defined by the address words provided by the sequencer 30, in synchronism with the clock pulses generated by the timing circuit 26. The output data words are applied to the D/A converter 28, which operates under control of the clock pulses generated by the timing circuit 26 to reconstruct the digital data into the composite video output signal, which is provided at a video signal output terminal 50 and in which the sync pulses and the subcarrier are in phase with the sync pulses and subcarrier of the reference signal.

There is no definite phase relation between the clock pulses generated by the timing circuit 26 and those generated by the timing circuit 10. Therefore, in order to avoid contentions between the read and write demands imposed upon the memory array, the memory array includes not only random access memories (the storage elements proper) but also input data registers, for temporarily storing input data words until access can be had to the RAMs, and output data registers, for temporarily storing output data words from the RAMs until access can be had to the memory's internal data bus. In addition, the address word provided by the sequencer 16 or 30 is maintained at the output of the respective sequencer until that sequencer is called upon, by the lock and timing circuit 10 or 26, to provide the next address word. This interval is long enough to insure that if, for example, a write access is being performed when the read address sequencer 30 receives a clock signal and generates the next address word in its sequence, and thus calls for a read access, there is sufficient time to complete the write access before the said next address word is removed from the output of the sequencer 30. The arbitrator 22 utilizes the memory access request signals to control the accessing of the memory so as to resolve conflicts between the demands placed on the RAMs.

It will be noted that the write address sequencer 30 is also connected to the controller 20. The purpose of this connection is to provide to the controller the address of the memory location at which the data word representing a selected point of each frame of the input video signal, e.g., the leading edge of sync on line 1, is stored. The read address sequencer identifies the corresponding point of the reference video signal, and the controller provides the address of the relevant data word to the read address sequencer. The read address sequencer uses the address of this selected reference point as the starting point for reading data words from the memory 32, and it is in this manner that the desired synchronization is accomplished.

In addition to the components whose functions have already described, the frame synchronizer comprises the pattern generator 14 interposed between the A/D converter 12 and the memory array 32, and the pattern detector 33 and the pattern detector and blanking circuit 34 interposed between the memory array 32 and the D/A converter 28. The timing circuit 10, as well as generating the clock pulses for controlling operation of the A/D converter 12 and the write address sequencer 16, also detects the vertical blanking interval of the input video signal and causes the pattern generator 14 to insert an alternating pattern of test data words 1000000000 and 0111111111 into the stream of video data words passing from the A/D converter to the memory array during an unused line, for example line 9, of the vertical blanking interval of the input signal. The test data words are field correlated, i.e., after each odd-numbers field the word 1000000000, e.g., is inserted and after each even-numbered field the word 0111111111 is inserted. The pattern detector 33 is controlled by the timing circuit 26 to examine the data words read out from the memory during line 9 of the vertical blanking interval of the reference signal. The pattern detector compares the complement of the most significant bit of each test data word received during line 9 of the vertical blanking interval with the remaining data bits of the word. A non-match indicates a fault condition which results in a signal being generated to cause latches 36 and 38 to store the address word identifying the location in the memory array from which the word was read and the word itself. The address word and the test data word are applied to the controller 20.

The pattern detector and blanking circuit 34 is also controlled by the timing circuit 26 to examine, in similar manner to the pattern detector 33, the data words read out during line 9 of the vertical blanking interval of the reference signal. In the event that a fault is detected, the circuit 34 provides a signal to the controller 20. The circuit 34 also reinserts the blanking level into the stream of words which is passed on to the D/A converter 28.

The total number of memory locations in the memory array is greater than the total number of memory locations required to store an entire frame and is not equal to an integral multiple thereof. The data words applied to the memory array are written into the memory sequentially, using all the memory locations. Accordingly, the selected alternating pattern of words inserted by the pattern generator causes all data lines and all memory locations to be exercised to both allowable states during quite a short period of time.

The controller 20 examines the address and data words received from the latches 36 and 38. If an error is observed in the same bit of numerous data words, an interface fault is indicated. In a practical construction of the frame synchronizer, the memory array 32 and the arbitrator 22 are constructed on a first circuit board, and the pattern detector 33 and the latches 36 and 38 are constructed on a second circuit board with the blocks 16, 18, 20 and 30. The pattern detector 34 and the D/A converter 28 are constructed on yet a third board. If an interface fault is detected by the circuit 33 and a corresponding fault is detected by the circuit 34, an interface fault between the first and second circuit boards or between the memory 32 and the pattern generator 14 is indicated. If an interface fault is detected by the circuit 34 without a corresponding fault being detected by the circuit 33, an interface fault between the second and third boards is indicated. A repeated non-match at the same bit position of a given memory location, with a corresponding error being detected by the circuit 34, indicates a memory fault. Pattern sensitivity errors in memory may also be detected by virtue of the nearly random nature of the video data in memory and of the fact that the test pattern overwrites that data. When the controller has received sufficient information to enable it to diagnose the particular fault giving rise to errors, it causes a visible error message to be displayed by means of LEDs 40. The controller is also provided with switches 42 which enable more specific information regarding the fault condition to be displayed by the LEDs 40.

Unlike many data processing applications, in a digital video signal processing apparatus a fault condition does not always require that the apparatus be taken out of service. Thus, a fault in one bit position of a given memory location, so that the bit read out from the position is always a one or is always a zero, does not normally degrade the composite video output signal to such an extent that the frame synchronizer could not be used. Clearly, however, it is desirable that the effect of the fault condition should be concealed as far as possible. Accordingly, it is preferred that a bit shifter circuit 44, as shown in broken lines in the drawing, should be interposed between the pattern generator 14 and the memory array 32, so that a less significant bit of an input data word is directed to a faulty bit position, and a second bit shifter circuit 46 should be interposed between the memory array 32 and the pattern detector 34 for restoring the bits of output words to their previous positions. The directing of the less significant bit to the faulty bit position may be controlled automatically in response to the error detection.

It will be appreciated that the invention is not restricted to the particular digital data processing apparatus that has been described, since variations may be made therein without departing from the scope of the invention as defined in the appended claims, and equivalents thereof. For example, the invention is not restricted to use with a frame synchronizer, in which the output data from the circuit under test (the memory array) is identical to the input data, but can also be applied to other apparatus in which the output data bears a predetermined relationship to the input data. It is not essential that a plurality of test data words be written consecutively into the circuit under test and read out consecutively from the circuit under test. In certain applications, it may be desirable to write a single test word into the circuit under test, followed by a block of data words, then a second test word followed by a second block of data words, and so on.

I claim:

1. A method of testing a digital memory apparatus that comprises a memory device having first through mth separately addressable memory locations each memory location storing a digital word having n binary digits, input means for writing a digital signal into the memory device, and means for reading the contents of each memory location out of the memory device, the method comprising applying a digital input signal having a succession of sequences of p digital words, where p is an even number less than m and is not an integral submultiple of m, to the input means, modifying the digital input signal by inserting a predetermined digital test word into the digital input signal in place of the qth word of each sequence, writing the modified sequences into the first through mth separately addressable memory locations sequentially and repeatedly, reading the contents of the first through mth memory locations sequentially and repeatedly, and comparing at least one predetermined digit of the qth digital word of each sequence read out of the memory device with other digits of that word and thereby determining whether the memory apparatus is operating properly.

2. A method according to claim 1, wherein q is less than p/2 and the method comprises inserting a first predetermined digital test word into the digital input signal in place of the qth word of each sequence and inserting a second predetermined test word into the digital input signal in place of the (q+p/2)th word of each sequence, the second test word being the complement of the first test word, and the method further comprises comparing at least one digit of the qth and (q+p/2)th words of each sequence read out of the memory device with the other digits of that word.

3. A method according to claim 2, further comprising inserting the second predetermined digital test word into the digital input signal in place of the (q+1)th word of each sequence and inserting the first predetermined digital test word into the digital input signal in place of the (q+p/2+1)th word of each sequence.

4. A method according to claim 2, wherein the most significant digit of the first digital test word has one of the two possible binary states and each other digit of the first digital test word has the other of the two possible binary states.

5. A method according to claim 2, wherein each sequence of p digital words represents in digital form one frame of a composite video signal, and wherein the qth and (q+p/2)th words fall within the vertical blanking interval following respective fields of one frame of the video signal.

6. In combination, digital memory apparatus operating to receive a digital signal having a succession of sequences of p digital words, where p is an even number and greater than zero, and test apparatus for determining whether the memory apparatus is operating properly, the memory apparatus comprising a memory device having first through mth separately addressable memory locations (where m is greater than p and is not an integral multiple of p) each memory location storing a digital word having n binary digits, input means for receiving a succession of sequences of p digital input words and writing the succession of sequences of p digital words into the memory device sequentially and repeatedly, and output means for reading digital words from the memory device sequentially and repeatedly, and the test apparatus comprising means operating during normal operation of the memory apparatus for modifying the succession of sequences of p digital input words received by the input means by replacing the qth word of each sequence by a predetermined digital test word having n binary digits, so that the modified sequences are written into the memory device sequentially and repeatedly, and comparison means for determining whether the word read out of the memory device as the qth word of each sequence is identical to the predetermined digital test word.

7. A combination according to claim 6, wherein q is less than p/2 and the means for modifying the sequences of digital input words comprise means for replacing the qth and (q+p/2)th words of each sequence by first and second predetermined digital test words respectively, the second test word being the complement of the first test word, and the comparison means comprise means for determining whether the digital words read out of the memory device as the qth and (q+p/2)th words of each sequence are identical to the first and second test words respectively.

* * * * *